(12) United States Patent
Guest

(10) Patent No.: US 9,631,756 B2
(45) Date of Patent: *Apr. 25, 2017

(54) CONNECTOR

(71) Applicant: JOHN GUEST INTERNATIONAL LIMITED, Middlesex (GB)

(72) Inventor: Timothy Steven Guest, Middlesex (GB)

(73) Assignee: John Guest International Limited, Middlesex (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/003,569

(22) Filed: Jan. 21, 2016

(65) Prior Publication Data

US 2016/0138745 A1 May 19, 2016

Related U.S. Application Data

(62) Division of application No. 14/512,822, filed on Oct. 13, 2014, now Pat. No. 9,322,499.

(30) Foreign Application Priority Data

Oct. 11, 2013 (GB) .................................. 1317990.8

(51) Int. Cl.
*F16L 31/00* (2006.01)
*F16L 37/12* (2006.01)
*F16L 37/092* (2006.01)

(52) U.S. Cl.
CPC ............... *F16L 37/12* (2013.01); *F16L 31/00* (2013.01); *F16L 37/0925* (2013.01); *F16L 2201/10* (2013.01)

(58) Field of Classification Search
CPC ... F16L 37/0925; F16L 37/091; F16L 37/088; F16L 37/086; F16L 37/092
(Continued)

(56) References Cited

U.S. PATENT DOCUMENTS 4,005,883 A 2/1977 Guest
4,573,716 A 3/1986 Guest
(Continued)

FOREIGN PATENT DOCUMENTS

AU 2009100504 A4 7/2009
AU 2009101187 A4 12/2009
(Continued)

OTHER PUBLICATIONS

United Kingdom Search Report issued May 8, 2014, filed in GB Application No. GB 1317990.8, filed Oct. 11, 2013.

*Primary Examiner* — David E Bochna
(74) *Attorney, Agent, or Firm* — Workman Nydegger

(57) ABSTRACT

A connector comprising a body (1) having a throughway (5) which is open at one end (4). A shoulder (8) in the throughway faces the open end and supports an O-ring (9). A collet (3) in the open end of the throughway has a plurality of legs (18) extending away from the open end, each engaging with the body and having an inwardly facing tooth to grip, in use, a tube in the throughway. The body has a plurality of fingers (11) extending to the open end. The connector further comprises a cap (2) fitting over the open end of the body and extending from the open end towards the opposite end. The cap has a plurality of recesses (23) in a wall at the open end into each of which a finger is retained by a snap fit.

21 Claims, 2 Drawing Sheets

(58) Field of Classification Search
USPC .......................................... 285/322, 323, 243
See application file for complete search history.

(56) References Cited

U.S. PATENT DOCUMENTS

| | | |
|---|---|---|
| 4,606,783 A | 8/1986 | Guest |
| 4,637,636 A | 1/1987 | Guest |
| 4,645,246 A | 2/1987 | Guest |
| 4,650,529 A | 3/1987 | Guest |
| 4,657,286 A | 4/1987 | Guest |
| 4,722,560 A | 2/1988 | Guest |
| 4,804,213 A | 2/1989 | Guest |
| 4,923,220 A | 5/1990 | Guest |
| 4,946,213 A | 8/1990 | Guest |
| 4,958,858 A | 9/1990 | Guest |
| 5,370,423 A | 12/1994 | Guest |
| 5,390,969 A | 2/1995 | Guest |
| 5,401,064 A | 3/1995 | Guest |
| 5,443,289 A | 8/1995 | Guest |
| 5,468,027 A | 11/1995 | Guest |
| 5,607,193 A | 3/1997 | Guest |
| 5,683,121 A | 11/1997 | Guest |
| 5,738,387 A | 4/1998 | Guest |
| 5,775,742 A | 7/1998 | Guest |
| 5,779,284 A | 7/1998 | Guest |
| 5,915,738 A | 6/1999 | Guest |
| 6,056,326 A | 5/2000 | Guest |
| 6,109,664 A | 8/2000 | Guest |
| 6,173,999 B1 | 1/2001 | Guest |
| 6,439,620 B1 | 8/2002 | Guest |
| 6,863,314 B2 | 3/2005 | Guest |
| 6,880,865 B2 | 4/2005 | Guest |
| RE38,786 E | 8/2005 | Guest |
| 6,929,289 B1 | 8/2005 | Guest |
| 6,957,833 B2 | 10/2005 | Guest |
| 7,021,669 B1 | 4/2006 | Lindermeir et al. |
| 7,032,932 B2 | 4/2006 | Guest |
| 7,082,957 B2 | 8/2006 | Guest |
| 7,100,948 B2 | 9/2006 | Guest |
| 7,186,371 B1 | 3/2007 | Watling |
| 7,410,193 B2 | 8/2008 | Guest |
| 7,425,022 B2 | 9/2008 | Guest |
| 7,490,865 B1 | 2/2009 | Tsai |
| 7,506,658 B2 | 3/2009 | Guest et al. |
| 7,644,959 B2 | 1/2010 | Guest |
| 7,758,085 B2 | 7/2010 | Guest |
| 8,029,024 B2 | 10/2011 | Guest |
| 8,056,937 B2 | 11/2011 | Guest |
| 8,444,325 B2 | 5/2013 | Guest |
| 9,322,499 B2 * | 4/2016 | Guest .................. F16L 37/0925 |
| 2002/0109353 A1 | 8/2002 | Guest |
| 2003/0085568 A1 | 5/2003 | Guest |
| 2003/0201641 A1 | 10/2003 | Guest |
| 2003/0201642 A1 | 10/2003 | Guest |
| 2003/0201643 A1 | 10/2003 | Guest |
| 2004/0061329 A1 | 4/2004 | Guest |
| 2004/0084107 A1 | 5/2004 | Guest |
| 2005/0264009 A1 | 12/2005 | Guest |
| 2006/0181080 A1 | 8/2006 | Guest |
| 2006/0202478 A1 | 9/2006 | Guest |
| 2007/0034255 A1 | 2/2007 | Guest |
| 2007/0194568 A1 | 8/2007 | Guest |
| 2007/0200344 A1 | 8/2007 | Guest |
| 2007/0284875 A1 | 12/2007 | Salomon-Bahls et al. |
| 2008/0136166 A1 | 6/2008 | Guest |
| 2009/0140514 A1 | 6/2009 | Guest |
| 2009/0295152 A1 | 12/2009 | Guest |
| 2011/0033165 A1 | 2/2011 | Guest |
| 2011/0089684 A1 | 4/2011 | Schutte |
| 2011/0309614 A1 | 12/2011 | Guest |
| 2012/0104749 A1 | 5/2012 | Kang |
| 2013/0257036 A1 | 10/2013 | Guest |
| 2013/0257043 A1 | 10/2013 | Guest |
| 2015/0102599 A1 | 4/2015 | Guest |
| 2015/0159792 A1 | 6/2015 | Bobo |

FOREIGN PATENT DOCUMENTS

| | | |
|---|---|---|
| DE | 203 19 959 U1 | 6/2005 |
| EP | 0 113 528 A1 | 8/1984 |
| EP | 1146275 A1 | 10/2001 |
| EP | 2 400 201 A1 | 12/2011 |
| GB | 2 448 684 A | 10/2008 |
| WO | 2005/024284 A1 | 3/2005 |
| WO | 2005/049129 A1 | 6/2005 |

* cited by examiner

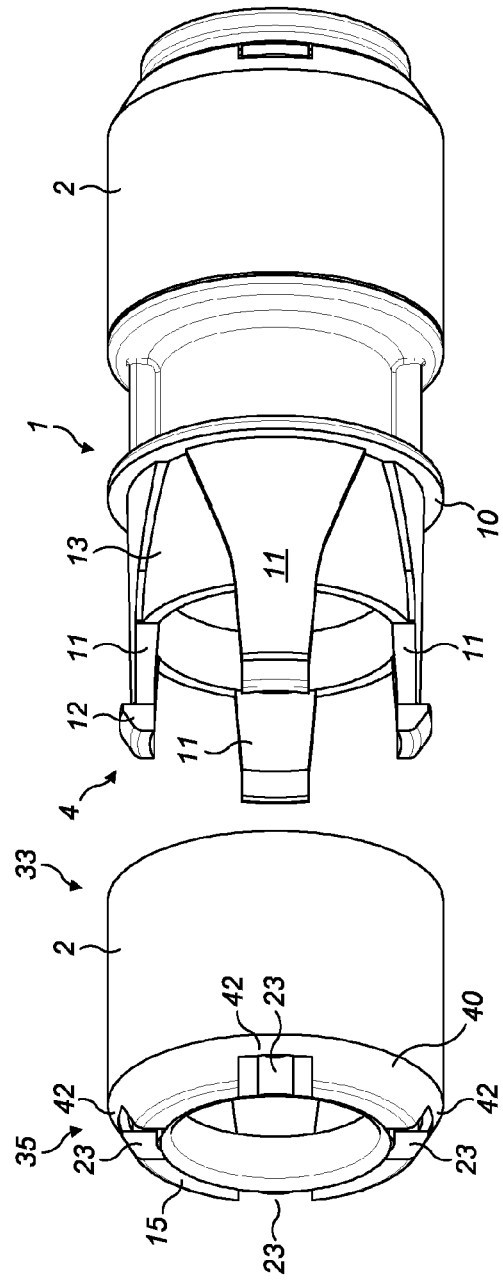
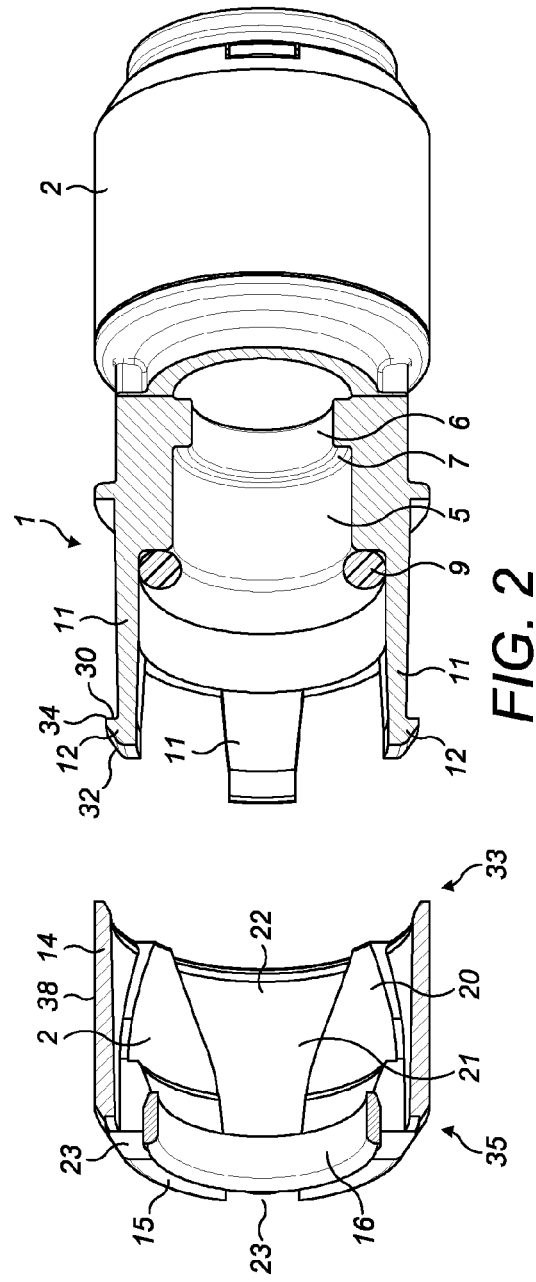

CONNECTOR

CROSS-REFERENCE TO RELATED APPLICATIONS

This application is a continuation of U.S. application Ser. No. 14/512,822, filed Oct. 13, 2014, U.S. Pat. No. 9,322,499, which claims priority to United Kingdom Application No. 1317990.8, filed Oct. 11, 2013, the contents of which are incorporated herein by specific reference.

BACKGROUND OF THE INVENTION

1. The Field of the Invention

The present invention relates to a connector for joining plastic tubes.

2. The Relevant Technology

In particular, the present invention relates to a connector comprising a body having a throughway which is open at one end, a shoulder in the throughway which faces the open end and supports an O-ring; a collet in the open end of the throughway and having a plurality of legs extending away from the open end, each engaging with the body and having an inwardly facing tooth to grip, in use, a tube in the throughway. Such a connector will subsequently be described as "of the kind described".

Connectors of the kind described have found widespread use in applications for connecting plastic tubes and the like, for example, in plumbing, electrical cables and fibre optic applications. They provide a quick and reliable method of joining two cables together or connecting a cable to another component.

A conventional connector of the kind described has a two-part body assembly. This consists of a body which is provided with the internal features such as the shoulder described above and a cap which is fitted over the body and is ultrasonically welded in place. This is necessary as the profile of the body cannot readily be moulded in a single piece.

While the ultrasonically welded cap has a number of advantages and has proved commercially successful, it does have a number of drawbacks. The welding process requires complex equipment. The materials of the cap and body must be compatible with one another and suitable for ultrasonic welding, and the cap and the body must be sufficiently thick and robust to allow the welding.

In an attempt to address these problems, it has been proposed (for example in the John Guest 3 mm Miniature Straight Connector, Product #DS-NC2129) that the end of the cap opposite to the open end is provided with an inwardly facing annular shoulder which is snap fitted over a complimentary outwardly facing annular shoulder on the body.

This overcomes the above problems with ultrasonic welding. However, it introduces problems of its own. The snap ring on the cap has to expand radially outwardly as it is pushed into the body. This puts considerable strain on the cap which can lead to cracking. Also, as the annular snap ring snaps into place behind the shoulder on the body, this snapping into place can actually cause impact cracking.

Further, when in situ if a bending load is applied to the connector, the bending force is such that it tends to pull the snap ring away from the shoulder on one side, while on the opposite side, the snap ring can be forced towards the shoulder, these stresses can cause the cap to crack or become dislodged from the body.

SUMMARY OF THE INVENTION

According to the present invention, a connector of the kind described is characterised in that the body has a plurality of fingers extending to the open end; the connector further comprising a cap fitting over the open end of the body and extending from the open end towards the opposite end, the cap having a plurality of recesses in a wall at the open end into each of which a finger is retained by a snap fit.

The present invention has two features which improve upon the above mentioned prior art. Firstly, it has a plurality of fingers to provide the snap fit, and secondly the snap fit is now in the end of the cap adjacent to the open end, rather than being at the opposite end as with the prior art. Thus, when the cap is put in place, it is individual fingers of the body which flex inwardly. These are therefore subjected to far less stress than an annular ring which is deflected outwardly.

Further, as the snap fit engagement is now at the open end of the connector, the forces experienced at this point when the connector is subjected to a bending load are significantly less than those which are experienced at the opposite end of the cap in the prior art. Also, as the snap fit engagement is between a plurality of discrete fingers, rather than an annular ring, it is far more difficult to dislodge the cap as there is no tendency for the fingers to be "peeled" off the recesses with which they engage.

It is possible that each recess in the wall does not extend all the way through the wall. However, preferably, each recess extends fully through the wall. This means that each finger is visible at the end wall allowing visual confirmation that the cap and body have correctly engaged.

The inner wall of the end cap may be featureless such that, upon assembly, the cap and body are visually aligned by the person doing the assembling. Alternatively, the inner wall of the cap may be provided with parallel guideways to guide each finger into the recess. However, preferably, an inwardly facing surface of the cap is provided with a guideway associated with each recess, the guideway having a wide mouth at the end opposite the wall and tapering towards the recess. Preferably, each mouth subtends an angle of at least 50°. This facilitates the assembly process as the assembler does not need to precisely align the cap and the body. Instead, the body can be inserted into the cap out of alignment and the guideways will guide the fingers to the correct position at the end of the cap.

BRIEF DESCRIPTION OF THE DRAWINGS

An example of a connector in accordance with the present invention will now be described with reference to the accompanying drawings, in which:

FIG. 1 is a perspective view of the cap and body prior to assembly;

FIG. 2 is a view similar to FIG. 1, but with the front part of the cap and a part of the body cut away;

DETAILED DESCRIPTION OF THE PREFERRED EMBODIMENTS

Figure 3:
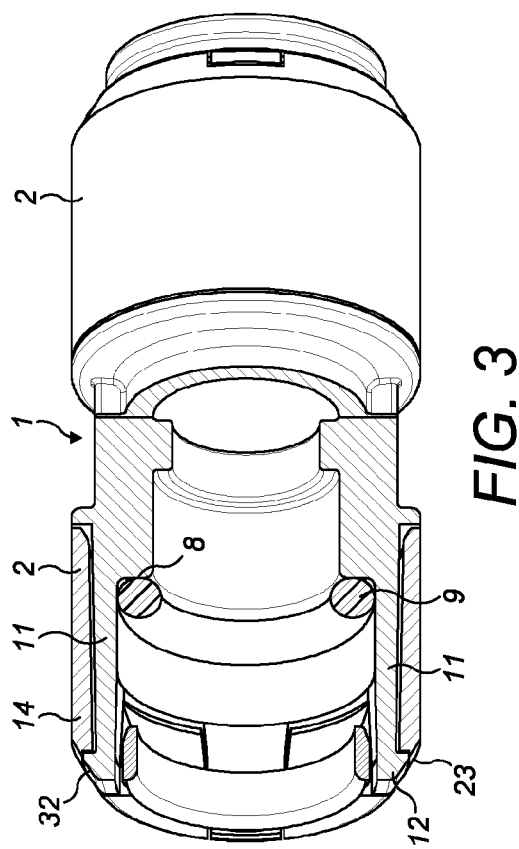
FIG. 3 is a view similar to FIG. 2 with the cap and body assembled.

The connector broadly consists of three main components, namely the body 1, cap 2 and collet ring 3. As shown in the drawings, the connector is a double-ended connector having a cap 2 at each end. The connector is suitable for connecting two tubes together. However, the invention could equally apply to a single-ended connector to connect the tube to an underlying structure. Alternatively, the double-ended connector could be provided with a connector according to the present invention at one end and a different type of connector at the opposite end.

Figure 4:
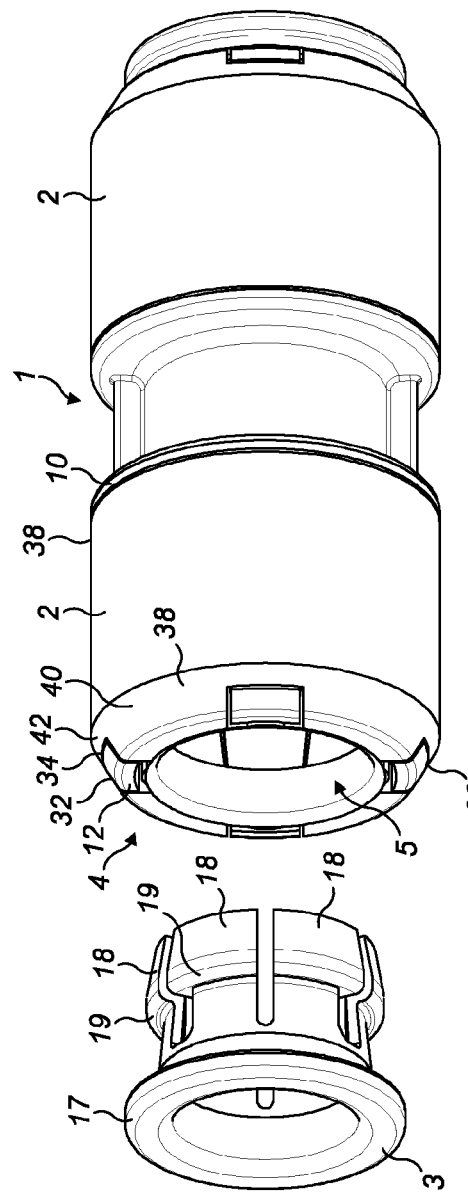
FIG. 4 is a perspective view showing the cap and body assembled prior to insertion of the collet ring.

The body 1 is open at one end 4 and has an axial throughway 5 extending through the connector. The throughway 5 is a stepped bore having a narrow diameter portion 6 with a diameter which corresponds approximately with the inner diameter of the tube. This portion 6 terminates at a first shoulder 7 facing the open end 4 against which the tube abuts, in use. A second shoulder 8 provides a further outward step for the bore and is arranged to receive an O-ring 9 which seals, in use, against the tube. Also in the vicinity of this region is an outwardly extending annular flange 10 which provides an end stop for the cap 2 as best shown in FIG. 4. It is noted that flange 10 is the maximum outer diameter of body 1 and, as depicted in FIG. 4, is equal to the maximum outer diameter of cap 2.

Extending towards the open end 4 of the body are four fingers 11 which are evenly spaced about the axis. Although four are illustrated, there may be more or less than this in practice and they do not necessarily need to be evenly spaced. Each finger is provided at the open end 4 with a radially outwardly projecting barb 12. Each barb 12 is tapered and has an inside shoulder 30 and an outside face 32 that intersect at an outside corner 34. Each finger extends to a ring 13 as best shown in FIG. 1. Each of the fingers 11 is flared away from the open end and this flared portion has a greater thickness than the thickness of the ring 13 to provide a tapering profile for the purpose set out below.

The end cap 2 has a generally annular shape that extends between a first end 33 and an opposing second end 35. It has an outer wall 14 extending along its full length and terminating at an end wall 15 which is at the open end 4 once the cap is fitted in place. Outer wall 14 has an inwardly facing inside face 20 and an opposing outwardly facing outside face 38 that both extend to end wall 15. The end wall 15 extends radially inwardly to an inner wall 16 which extends away from an open end 4 for a short distance.

This inner wall 16 provides a shoulder for engagement with the collet ring 3 as is known in the art. The collet ring 3 has an end ring 17 from which a plurality of resilient legs 18 extend away from the open end 4. The ends of the legs extend radially outwardly to define a shoulder 19. The collet ring 3 is inserted into the collet such that the legs 18 deflect radially inwardly until the shoulder 19 passes the inner wall 16. In use, when a tube inserted into the connector is pulled in a direction which would tend to pull it out of the connector, there are teeth (not shown) on the inner surface of the collet legs which grip the outer surface of the tube. This pulling force causes the shoulder 19 to engage with the inner wall 16 causing inward deflection of the legs increasing the gripping force on the tube. This operation of the collet is entirely conventional and is well understood in the art.

The inside face 20 of the outer wall 14 is provided with a profiled surface which matches the profile of the ring 13 described below. This profile features four guideways 21, one for each finger 11 which have a wide mouth 22 at the end opposite to the end wall 15, which then tapers towards a window/recess 23 in the end wall 15. Each window/recess 23 passes from inside face 20 to outside face 38 so as to pass through outer wall 14. Each window/recess 23 also passes through end wall 15. Outer wall 14 of cap 2 includes an annular tapered section 40 that encircles throughway 5 of body 1. Annular tapered section 40 extends to end wall 15 with each window/recess 23 intersecting therewith. Annular tapered section 40 includes a plurality of tapered portions 42 that are disposed directly adjacent to each window/recess 23 on the side toward first end 33 of cap 2.

When the cap is placed on the body, any misalignment between the fingers 11 and the windows/recesses 23 can be accommodated by the wide mouth 22 which will alter the radial alignment between the body 1 and the cap 2 as the cap is pushed into the body until the fingers 11 line up with the windows/recesses 23.

As the cap 2 is pushed into place, the fingers 11 will deflect inwardly. As they are thin components (compared to an annular shoulder), they can readily accommodate this small amount of inward deflection without causing undue stress on the material. As the cap 2 reaches the position in which it is fully engaged with the body 1, the barbs 12 on the end of the fingers 11 snap into the windows/recesses 23 to retain the cap 2 in place. The impact force of a relatively narrow finger 11 snapping into place is a fraction of the force of the annular shoulder of the prior art snapping into place. The barbs 12 are visible at the windows/recesses 23 allowing an assembler to confirm that the cap 2 is in the correct position in the body 1. The assembly process is therefore one which is very easy and reliable and does not place undue stress on the body 1 or the cap 2.

As depicted in FIGS. 3 and 4, it is noted that when barbs 12 are received within windows/recesses 23, outside face 32 of each barb 12 is flush with outside face 38 of tapered section 40 and tapered portions 42. Furthermore, outside face 32 and outside corner 34 of each barb 12 is openly exposed through outside face 38 of cap 2 as a result of windows/recesses 23. In addition, outside face 38 of each tapered portion 42 of cap 2 is aligned with outside face 32 of the adjacent barb 12 and is disposed at substantially the same angle as the outside face 32 of the adjacent barb 12 so that outside face 32 of barb 12 is a continuation of outside face 38 of each tapered portion 42 of cap 2.

If a bending force is applied to the tube inserted in a connector, the bending force is effectively centred around the open end 4 and will therefore be lower at this point than it is at a position further from the open end. Thus, although the bending load may have some tendency to cause the end of the cap opposite to the open end to be separated from the body, this can be tolerated as no part of the fixing is done at this end. The fixing at the open end remains largely unaffected by such a force.

What is claimed is:

1. A connector comprising:
   a body having a throughway which is open at one end, a shoulder in the throughway faces the open end and supports an O-ring, the body having a plurality of fingers extending to the open end with a barb projecting from each finger, each barb having an outside face;
   a collet having a plurality of legs that are at received within the open end of the body, each of the plurality of legs having an inwardly facing tooth; and
   a cap fitting over the plurality of fingers of the body, the cap having an encircling outer wall with an inwardly facing inside face and an outwardly facing outside face, the outside face being spaced radially outward from the inside face, a plurality of spaced apart windows extend laterally through the outer wall so as to extend through the inside face and through the outside face, each barb being received within a corresponding window.

2. The connector according to claim 1, wherein the outside face of each barb is openly exposed through the outside face of the cap.

3. The connector according to claim 1, wherein at least a portion of the outside face of each barb is flush with the outside face of the cap.

4. The connector according to claim 1, further comprising:
the barb of each finger being tapered; and
a portion of the outside face of the outer wall of the cap adjacent to each barb being tapered.

5. The connector according to claim 4, wherein the tapered portion of the cap adjacent to each barb has an outside face, the outside face of each tapered portion of the cap being aligned with the outside face of the adjacent barb and being disposed at substantially the same angle as the outside face of the adjacent barb.

6. The connector according to claim 4, wherein the outside face of the outer wall of the cap comprises an annular tapered section that encircles the throughway of the body and is disposed adjacent to the barbs of the fingers, the annular tapered section comprising each of the tapered portions.

7. The connector according to claim 6, wherein the plurality of windows extend through the annular tapered portion.

8. The connector according to claim 1, wherein each barb has an inside shoulder, the inside shoulder of each barb intersecting with the outside face of the corresponding barb at an outside corner, the outside corner being openly exposed.

9. The connector according to claim 1, further comprising a plurality of elongated guideways recessed on the inside face of the cap, each finger being received within a guideway.

10. The connector according to claim 9, wherein each of the guideways is tapered.

11. The connector according to claim 1, wherein each barb is snap fit within a corresponding window.

12. The connector according to claim 1, wherein the cap further comprises:
an annular inner wall disposed radially inward from the outer wall, the inner wall at least partially encircling an opening in which the collet is received; and
an end wall extending between the inner wall and the outer wall.

13. A connector comprising:
an annular body encircling a throughway which is open at one end of the body, the body having a shoulder in the throughway which faces the open end and having a plurality of fingers that extend to the open end with a barb projecting from each finger, a central longitudinal axis extends through the throughway along a length of the body, each barb having an outside face that inwardly slopes relative to the central longitudinal axis;
an O-ring disposed within the throughway and supported on the shoulder of the body;
a collet having a plurality of legs that are at received within the open end of the body, each of the plurality of legs having an inwardly facing tooth; and
a cap fitted over the plurality of fingers of the body, the cap having an inside face and an opposing outside face, a plurality of spaced apart recesses being formed on the cap into each of which the barb of one of the fingers is received, wherein a portion of the outside face of the cap towards the open end of the body inwardly slopes relative to the central longitudinal axis.

14. The connector according to claim 13, wherein the portion of the outside face of the cap that inwardly slopes is flush with outside face of at least one of the barbs.

15. The connector according to claim 13, wherein the portion of the outside face of the cap that inwardly slopes is directly adjacent to at least one of the plurality of recesses.

16. The connector according to claim 15, wherein the outside face of at least one of the barb is sloped so as to be a continuation of the sloped portion of the outside face of the cap.

17. The connector according to claim 13, wherein the body has a maximum outer diameter and the cap has a maximum outer diameter, the maximum outer diameter of the body and the cap being the same.

18. The connector according to claim 13, wherein the recesses comprise windows that extend laterally through the cap between the inside face and the outside face.

19. The connector according to claim 13, wherein the cap further comprises:
an annular outer wall having the inside face and the outside face;
an annular inner wall disposed radially inward from the outer wall, the inner wall at least partially encircling an opening in which the collet is received; and
an end wall extending between the inner wall and the outer wall.

20. A connector comprising:
a body having a throughway which is open at one end, a shoulder in the throughway faces the open end and supports an O-ring, the body having a plurality of fingers extending to the open end with a barb projecting from each finger, each barb having an outside face;
a collet having a plurality of legs that are at received within the open end of the body, each of the plurality of legs having an inwardly facing tooth; and
a cap fitting over the plurality of fingers of the body, the cap having an inwardly facing inside face and an outwardly facing outside face, a plurality of spaced apart windows extend through the cap between the inside face and the outside face, each barb being received within a corresponding window, a plurality of elongated guideways recessed on the inside face of the cap with each of the guideways being tapered, each finger being received within a guideway.

21. The connector according to claim 20, wherein the cap further comprises:
an annular outer wall having the inside face and the outside face;
an annular inner wall disposed radially inward from the outer wall, the inner wall at least partially encircling an opening in which the collet is received; and
an end wall extending between the inner wall and the outer wall.

* * * * *